(12) United States Patent
Ott et al.

(10) Patent No.: US 6,639,546 B1
(45) Date of Patent: Oct. 28, 2003

(54) RADAR SYSTEM IN WHICH RANGE AMBIGUITY AND RANGE ECLIPSING ARE REDUCED BY FREQUENCY DIVERSITY AND ALTERNATION OF PULSE PERIODICITY

(75) Inventors: David Ronald Ott, Huntingdon Valley, PA (US); Fotis Koubiadis, Mt. Laurel, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/268,173

(22) Filed: Oct. 10, 2002

Related U.S. Application Data
(60) Provisional application No. 60/333,205, filed on Nov. 6, 2001.

(51) Int. Cl.[7] ................................................ G01S 13/22
(52) U.S. Cl. ...................... 342/129; 342/135; 342/137
(58) Field of Search ............................... 342/118, 127, 342/128, 129, 130, 131, 134, 135, 137

(56) References Cited

U.S. PATENT DOCUMENTS 5,103,233 A * 4/1992 Gallagher et al. .......... 342/408
5,247,303 A * 9/1993 Cornelius et al. ............ 342/26
6,313,794 B1 * 11/2001 Rose ......................... 342/424

OTHER PUBLICATIONS

"Theory and application of optimum transmit–receive radar", Guerci, J.R.; Pillai, S.U.; Radar Conference, 2000. The Record of the IEEE 2000 International, 2000 pp. 705–710.*

"Short duration pulse radar experimental system integration and basic experimental research on the target detection", Liu Guojing; Wang Hongjun; Qiu Shi; Liu Guozhi; Pan Quan; Zhang Hongcai; Radar, 2001 CIE International Conference on, pp. 14–145.*

* cited by examiner

*Primary Examiner*—John B. Sotomayor
(74) *Attorney, Agent, or Firm*—Duane Morris LLP

(57) ABSTRACT

A radar system provides unambiguous and uneclipsed range by virtue of pulse-to-pulse frequency diversity, in combination with alternating interpulse intervals and processing which "fills in" target information in the ranges which would otherwise be eclipsed by transmitted pulses.

20 Claims, 5 Drawing Sheets

INTEGRATION METHODOLOGY

| RANGE INTERVAL COVERED | SUB-TIMING SIGNAL TRAIN # | PULSES INTEGRATED | INTRA-SUB-TIMING SIGNAL TRAIN INTEGRATION TYPE | INTER-SUB-TIMING SIGNAL TRAIN INTEGRATION TYPE |
|---|---|---|---|---|
| $R_{MIN}$ TO $R_A$ | 1 | 1 | NONE | THE OUTPUTS OF THESE INTEGRATIONS ARE THEN NON-COHERENTLY INTEGRATED |
|  | 2 | 1 | NONE |  |
|  | ... | ... | NONE |  |
|  | M | 1 | NONE |  |
| $R_A$ TO $R_B$ | 1 | $2,4,6,...N_1$ | NON-COHERENT | THE OUTPUTS OF THESE INTEGRATIONS ARE THEN NON-COHERENTLY INTEGRATED |
|  | 2 | $2,4,6,...N_2$ | NON-COHERENT |  |
|  | ... | ... | NON-COHERENT |  |
|  | M | $2,4,6,...N_M$ | NON-COHERENT |  |
| $R_B$ TO $R_{MAX}$ | 1 | $1,2,3...N_1$ | NON-COHERENT | THE OUTPUTS OF THESE INTEGRATIONS ARE THEN NON-COHERENTLY INTEGRATED |
|  | 2 | $1,2,3,...N_2$ | NON-COHERENT |  |
|  | ... | ... | NON-COHERENT |  |
|  | M | $1,2,3,...N_M$ | NON-COHERENT |  |

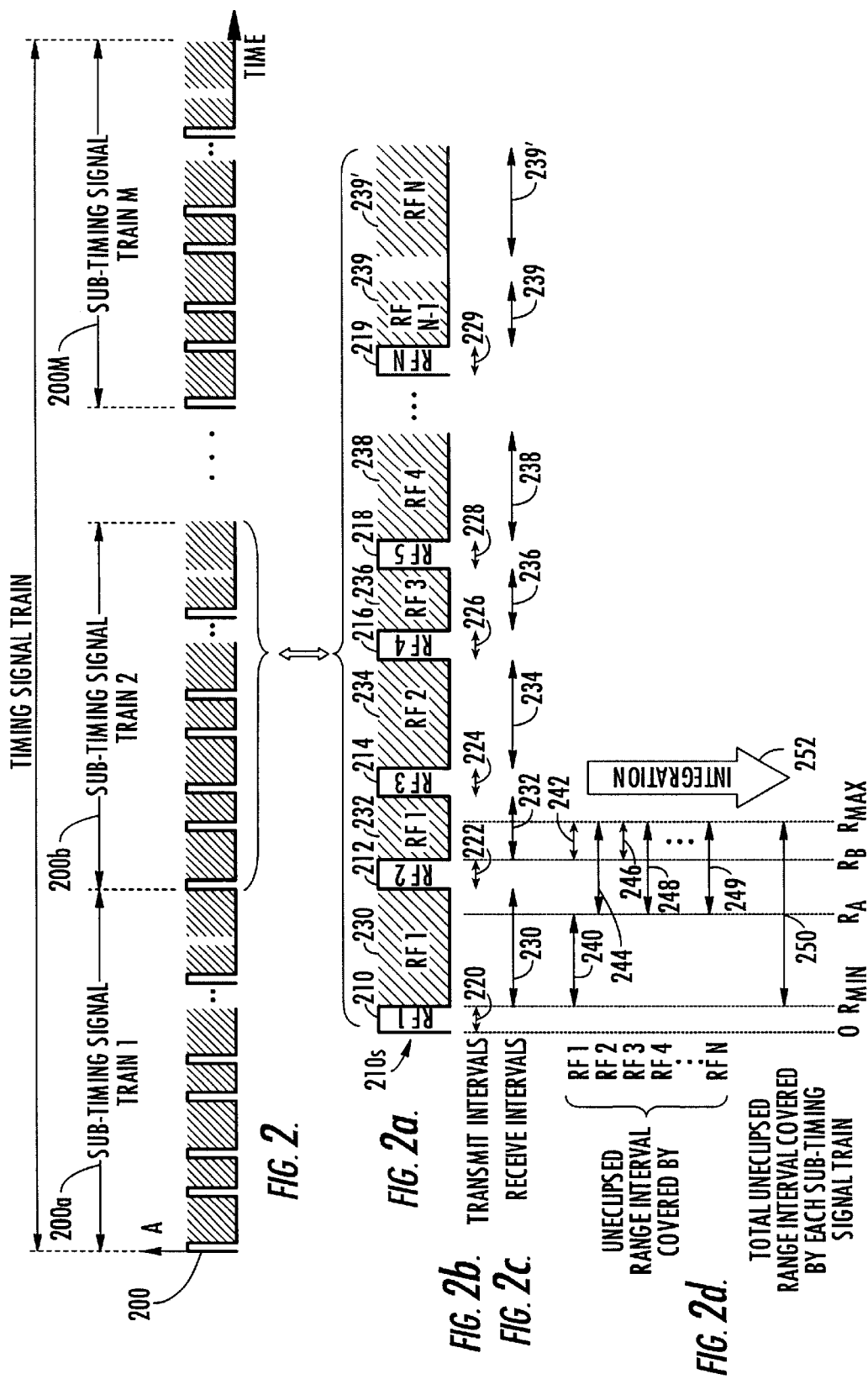

INTEGRATION METHODOLOGY

| RANGE INTERVAL COVERED | SUB-TIMING SIGNAL TRAIN # | PULSES INTEGRATED | INTRA-SUB-TIMING SIGNAL TRAIN INTEGRATION TYPE | INTER-SUB-TIMING SIGNAL TRAIN INTEGRATION TYPE |
|---|---|---|---|---|
| $R_{MIN}$ TO $R_A$ | 1 | 1 | NONE | THE OUTPUTS OF THESE INTEGRATIONS ARE THEN NON-COHERENTLY INTEGRATED |
| | 2 | 1 | NONE | |
| | ... | ... | NONE | |
| | M | 1 | NONE | |
| $R_A$ TO $R_B$ | 1 | $2,4,6,...N_1$ | NON-COHERENT | THE OUTPUTS OF THESE INTEGRATIONS ARE THEN NON-COHERENTLY INTEGRATED |
| | 2 | $2,4,6,...N_2$ | NON-COHERENT | |
| | ... | ... | NON-COHERENT | |
| | M | $2,4,6,...N_M$ | NON-COHERENT | |
| $R_B$ TO $R_{MAX}$ | 1 | $1,2,3,...N_1$ | NON-COHERENT | THE OUTPUTS OF THESE INTEGRATIONS ARE THEN NON-COHERENTLY INTEGRATED |
| | 2 | $1,2,3,...N_2$ | NON-COHERENT | |
| | ... | ... | NON-COHERENT | |
| | M | $1,2,3,...N_M$ | NON-COHERENT | |

*FIG. 2e.*

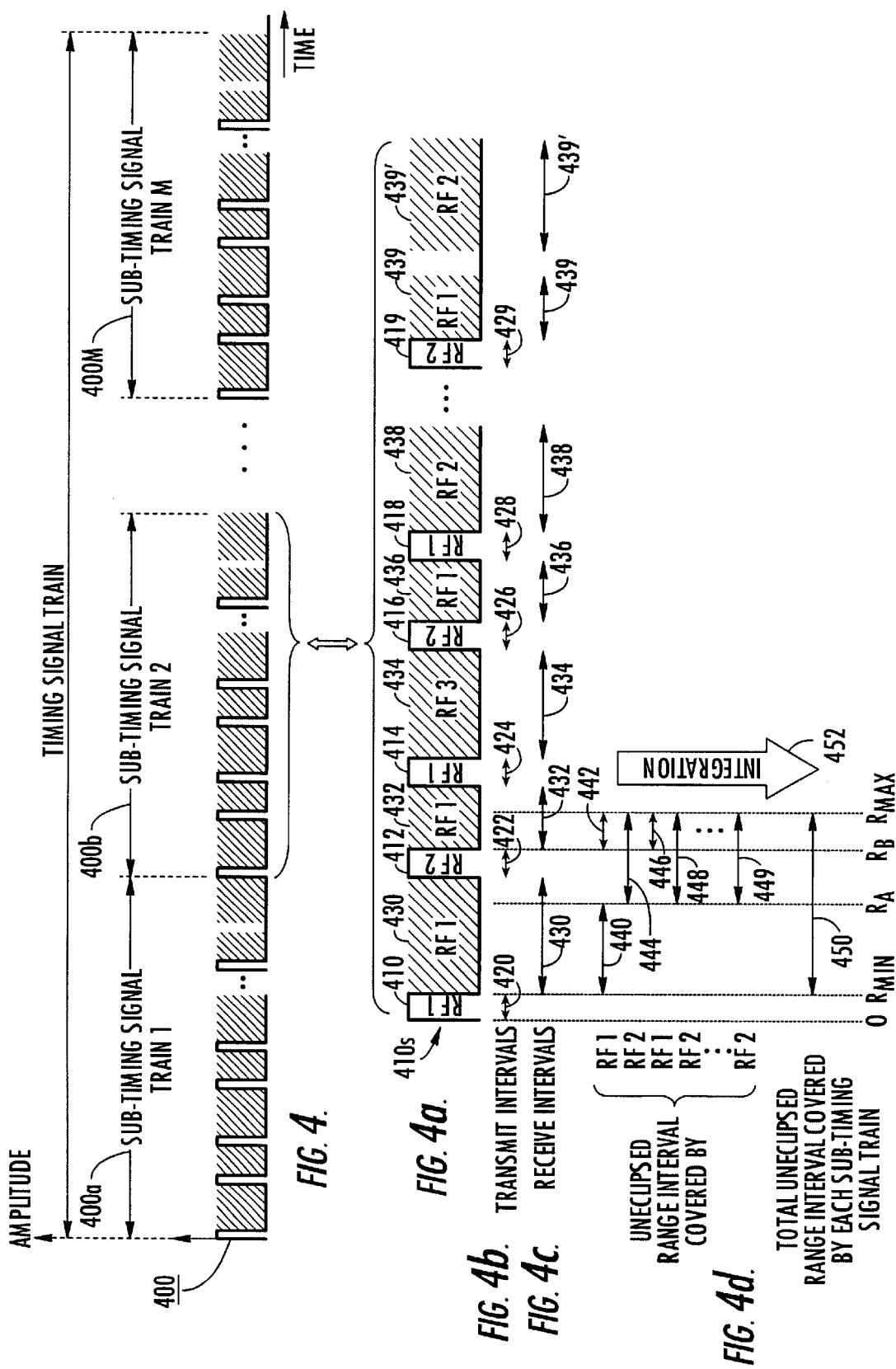

INTEGRATION METHODOLOGY

| RANGE INTERVAL COVERED | SUB-TIMING SIGNAL TRAIN # | PULSES INTEGRATED | INTRA-SUB-TIMING SIGNAL TRAIN INTEGRATION TYPE | INTER-SUB-TIMING SIGNAL TRAIN INTEGRATION TYPE |
|---|---|---|---|---|
| $R_{MIN}$ TO $R_A$ | 1 | 1 | NONE | THE OUTPUTS OF THESE INTEGRATIONS ARE THEN NON-COHERENTLY INTEGRATED |
| | 2 | 1 | NONE | |
| | ... | ... | NONE | |
| | M | 1 | NONE | |
| $R_A$ TO $R_B$ | 1 | $2,4,6,...N_1$ | COHERENT | THE OUTPUTS OF THESE INTEGRATIONS ARE THEN NON-COHERENTLY INTEGRATED |
| | 2 | $2,4,6,...N_2$ | COHERENT | |
| | ... | ... | COHERENT | |
| | M | $2,4,6,...N_M$ | COHERENT | |
| $R_B$ TO $R_{MAX}$ | 1 | $1,3,5,...N_1-1$ | COHERENT | THE OUTPUTS OF THESE INTEGRATIONS ARE THEN NON-COHERENTLY INTEGRATED |
| | | $2,4,6,...N_1$ | COHERENT | |
| | 2 | $1,3,5,...N_2-1$ | COHERENT | |
| | | $2,4,6,...N_2$ | COHERENT | |
| | ... | ... | COHERENT | |
| | M | $1,3,5,...N_M-1$ | COHERENT | |
| | | $2,4,6,...N_M$ | COHERENT | |

RADAR SYSTEM IN WHICH RANGE AMBIGUITY AND RANGE ECLIPSING ARE REDUCED BY FREQUENCY DIVERSITY AND ALTERNATION OF PULSE PERIODICITY

RELATED APPLICATIONS

This application claims the benefit of the date of Provisional Patent application No. 60/333,205, filed Nov. 6, 2001.

FIELD OF THE INVENTION

This invention relates to radar systems, and more particularly to pulsed radar systems used for surveillance.

BACKGROUND OF THE INVENTION

Radar systems are in widespread use for military, commercial, and private purposes. Radar systems have well-known characteristics, in that long-range detection of small targets is known to require transmission of more power, higher-gain antennas, and/or more sensitive receivers than that or those required for short-range detection of large targets. Among the characteristics of radar systems used for detecting targets at long range are those relating to range ambiguity, which has to do with reception of signals returned from a target lying beyond the range defined by the pulse repetition interval, which may make the distant target appear to be near the radar system. Another such characteristic of radar is that of range eclipsing, which has to do with the inability of a radar receiver to receive return signals during the pulse transmission interval.

A conventional solution to range eclipsing is to vary the pulse repetition interval, so that the transmitted pulses are staggered over time, thereby allowing the receiver to periodically "see" returned signals at times which would otherwise be lost or eclipsed. The eclipsing still occurs for each individual pulse train, but the totality of the radar returns over time includes information which fills in the gaps attributable to the individual transmitted pulse trains. The tradeoff is that a longer time is required to produce all the information required for an uneclipsed view of the region. Another possible solution to range eclipsing is to reduce the duty cycle of the radar by reducing the transmitted pulse duration, to thereby reduce the duration of the eclipsing. The reduction of the pulse duration, however, tends to reduce the transmitted energy, which reduces the range sensitivity, which again requires a longer period of integration in order to obtain the same effective range.

Another possible solution to range eclipsing is to reduce the duty cycle of the radar by increasing the pulse repetition interval to thereby move the increased range interval to a distant range not of interest. The reduction of the duty cycle and increase in the pulse repetition interval, however, tends to consume additional radar resources resulting in a greater overall time required for completion of a surveillance scan.

Conventional range ambiguity resolution techniques require transmission of additional signals with additional dwells for resolving the range interval of the ambiguous target. The additional dwells or transmissions consume additional radar resources, resulting in a greater overall time required for completion of a surveillance scan.

Improved radar systems that provide unambiguous and/or uneclipsed range coverage are desired.

SUMMARY OF THE INVENTION

A method for transmitting and receiving radar signals according to an aspect of the invention includes transmitting time-sequential pulses including first and second pulses at first and second mutually different frequencies, where the first and second pulses being separated by a first time duration, and receiving radar return signals at the first frequency during times corresponding to the first time duration and during a second time duration that begins after transmission of the second pulse, which second time duration is different from the first time duration, and also receiving the second frequency during a third time duration. The method according to this aspect of the invention also includes processing the radar return signals to provide signals representative of targets lying in an uneclipsed range nominally corresponding to the sums of (a) the sum of the first and second time durations and (b) the duration of the second pulse. In one mode of the method according to this aspect of the invention, the second time duration is less than the first time duration. In another mode of the method according to this aspect of the invention, the third time duration follows the first and second time durations.

According to a further aspect of a method according to an aspect of the invention, the additional step of transmitting additional pulses at additional frequencies is performed, where the additional frequencies are different from each other and from the first and second frequencies. These additional pulses are transmitted following the second pulse, and at least some of the additional pulses are transmitted later than the immediately preceding pulse by alternating ones of the first and second time durations. In this further aspect of a method according to an aspect of the invention, the further step is performed of receiving radar return signals at a frequency corresponding to one of the additional frequencies during a time interval which begins at a time following that pulse on which the one of the additional frequencies was transmitted by the sum of (a) one of the first and second time durations and (b) a pulse duration.

In yet another mode of a method according to an aspect of the invention, the further step is performed of processing the radar return signals at the additional frequencies together with at least some of the radar return signals at the first and second frequencies to produce the signals representative of targets. Another mode of the method according to an aspect of the invention further comprises, with a particular antenna pointing, repeating a particular number of times the steps of transmitting time-sequential pulses, receiving radar return signals, transmitting additional pulses at additional frequencies, receiving radar return signals at the additional frequencies, and processing the radar return signals.

Another method according to an aspect of the invention is for transmitting and receiving radar signals. This method comprises, with the radar antenna pointed in a particular direction, of generating a timing signal train including at least one sub-timing signal train, where each of the sub-timing signal trains includes at least first, second and third alternating and sequential pulse repetition intervals characterized by one of a β:1 and a 1:β ratio of (a) the duration from the start time of a given first pulse repetition interval to the start time of a second pulse repetition interval, where the second pulse repetition interval next follows the first pulse repetition interval, divided by (b) the duration from the start time of the second pulse repetition interval to the start time of a third pulse repetition interval next following the second pulse repetition interval, where β is given by 1+(αD), where α is equal to or greater than unity, and D is the duty cycle of the radar. In this method, in response to each sub-timing signal train, electromagnetic radar pulses are transmitted from the antenna such that the frequency of transmission in response to the first pulse of the sub-timing signal train is at a first radio frequency and the frequency of transmission in response to the second pulse of the sub-timing signal train is at a second radio frequency, different from the first radio frequency by an amount which allows subsequent separation of signals at the first and second frequencies. In addition, this method includes the reception, during that interpulse period immediately following the first pulse, of electromagnetic radar return signals originating in response to the first pulse, to thereby generate first received signals, reception, during that interpulse period immediately following the second pulse, of electromagnetic radar return signals originating in response to the first pulse, to thereby generate second received signals, and reception, during the third pulse repetition interval, of electromagnetic radar return signals originating in response to the second pulse, to thereby generate third received signals. The first and second received signals are concatenated, with a delay therebetween no less than the duration of the second pulse, to thereby produce a concatenated return signal originating from the first radio frequency pulse, which includes information relating to the presence or absence of targets in an unambiguous range interval extending from the end of the first pulse to near the beginning of the second pulse, and extending from the end of the second pulse to near the beginning of the third pulse repetition interval, but does not include information relating to the presence or absence of targets attributable to signals received during transmission of the second pulse. The third received signals are delayed by a time duration equal to the second pulse repetition interval, to thereby produce a delayed third return signal including information relating to the presence or absence of targets in the interval which coincides with ranges extending at least from the beginning of the second pulse to near the beginning of the third pulse repetition interval relative to the start of the sub-pulse train. Finally, this method combines the information from the concatenated return signal with the information from the delayed return signal to thereby produce signals representing the presence or absence of targets in the interval extending from the end of the first pulse to near the beginning of the third pulse repetition interval range unambiguously and range uneclipsed. The combining may include integration, which may be coherent or nonncoherent. In a particular mode of this method, the sub-timing-signal train includes N+1 pulse repetition intervals, where N is greater than or equal to two, N pulses of electromagnetic radiation are transmitted during the first N of the N+1 pulse repetition intervals, each at a different RF frequency, and the combining includes the step of noncoherent integration. In another particular mode of this method, the sub-timing-signal train includes N+1 pulse repetition intervals where N is greater than or equal to two, N pulses of electromagnetic radiation are transmitted during the first N of the N+1 pulse repetition intervals, wherein each pulse following the first two pulses represents transmission of electromagnetic energy at a frequency equal to that of the pulse transmitted two pulse repetition intervals earlier, and the combining includes at least one of the steps of (a) coherent and (b) noncoherent integration. In yet another particular mode of this method, the timing signal train includes M of the sub-timing signal trains, where M is greater than or equal to one, the number of pulse repetition intervals in each of the sub-timing signal trains need not be equal, and the combining includes at least one of the steps of (a) coherent integration and (b) non-coherent integration. According to a variant mode of a method according to an aspect of the invention, the further steps are included of re-steering the antenna following the generation of the timing signal train, and generating a second timing signal train that need not have the same number of the sub-timing signal trains nor the same number of the pulse repetition intervals per the sub-pulse train as earlier the timing signal train nor the same method of the combining. In one manifestation of a mode of a method according to an aspect of the invention, the timing signal train includes M of the sub-timing signal trains, where M is greater than or equal to one, the number of pulse repetition intervals in each of the sub-timing signal trains need not be equal, and the combining includes the step of coherent and/or non-coherent integration. In this manifestation, the further steps may be included of re-steering the antenna following the generation of the timing signal train and generating a second timing signal train that need not have the same number of the sub-timing signal trains nor the same number of the pulse repetition intervals per the sub-pulse train nor the same method of the combining as the earlier timing signal train.

BRIEF DESCRIPTION OF THE DRAWING

FIGS. 2, 2a, 2b, 2c, 2d, 2e together are a simplified timing diagram illustrating transmitted pulse timing according to one aspect of the invention, frequency diversity of the transmitted pulses, and also illustrating the method for processing, including frequencies received during certain intervals, and also including information relating to how information from the various received signals is combined to produce the desired range coverage;

FIGS. 4, 4a, 4b, 4c, 4d, 4e together are a simplified timing diagram illustrating transmitted pulse timing according to one aspect of the invention, frequency diversity of the transmitted pulses, and also illustrating the method for processing, including the frequencies received during certain intervals, and also including how the information from the various received signals is combined to produce the desired range coverage.

DESCRIPTION OF THE INVENTION

Figure 1:
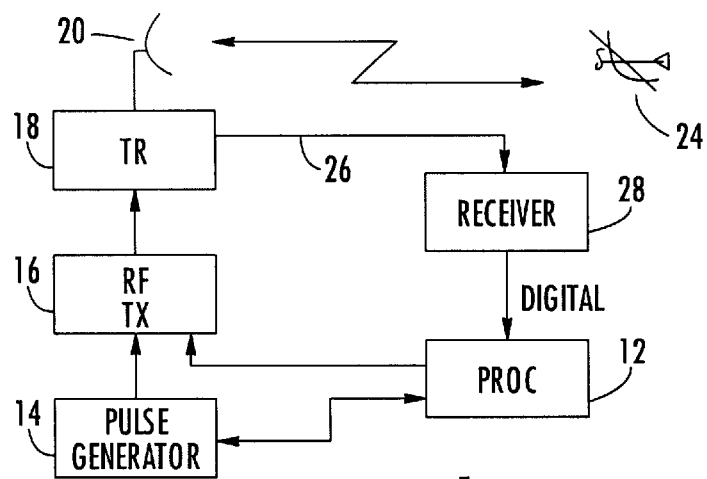
FIG. 1 is a simplified block diagram of a radar system.

In FIG. 1, a radar system 10 includes a controller/processor (Proc) 12, which provides overall control and also performs signal processing. Processor 12 controls the timing signals or pulses produced by a pulse generator 14. The recurrent timing signals produced by pulse generator 14 are applied to a radio-frequency (RF) transmitter (TX) illustrated as a block 16, which responds to the timing signals from block 14 and to commands from proc 12 by generating radio-frequency pulses. The radio-frequency pulses produced or generated by radio-frequency transmitter 16 have a pulse duration established by the duration of the timing signals produced by pulse generator 14, but the frequency of the RF of each radio-frequency pulse depends upon commands from processor 12. The radio-frequency pulses produced by RF TX 16, whatever their frequency may be, are coupled through a transmit-receive (TR) device 18 to an antenna 20.

Radio-frequency pulses of electromagnetic energy are transmitted from antenna 20 of FIG. 1 and proceed outward, as suggested by "lightning bolt" symbol 22. The transmitted pulses may or may not impinge upon a target, illustrated as an airplane 24. If no target is encountered, the transmitted pulses of electromagnetic energy continue their outward journey, and no portion returns. In the event that a target such as 24 is impinged upon, a portion of the transmitted pulse or pulses is reflected from the target, and returns toward antenna 20.

Return electromagnetic signals or pulses reflected from target 24 of FIG. 1 are coupled by antenna 20, TR device 18, and path 26 to a receiver 28. Receiver 28 performs conventional processing, such as analog filtration, low-noise amplification, and the like, and also converts the received analog signals into digital form for application to processor 12.

According to an aspect of the invention, processor 12 controls pulse generator 14 and RF transmitter 16 in such a manner as to increase the range-unambiguous, range-uneclipsed coverage of radar system 10 over that which would be possible with a conventional fixed pulse-repetition-frequency (PRF), fixed-RF-frequency radar, by at least alternating the pulse repetition interval (PRI), and by processing the return signals in such a manner that, conceptually, return signals originating from a first transmitted pulse of a sequence and returning during the first and second interpulse periods of the sequence are combined with a delay therebetween, and return signals originating from the second transmitted pulse and returning during that period following the third timing signal of the sequence are delayed, and the target information is extracted from both the combined and delayed returned signals, and combined to produce unambiguous, uneclipsed target information over the entire range interval of interest.

FIG. 2 is a simplified timing diagram illustrating a timing signal train 200 which may be produced by pulse generator 14 of FIG. 1 in accordance with an aspect of the invention. In FIG. 2, a timing signal train 200 is broken into a sequence of sub-timing-signal trains designated 200a, 200b, ..., 200M, where M is greater than or equal to one. Timing signal train 200 of FIG. 2 represents the timing signals which are generated by pulse generator 14 during the time when the antenna 20 is steered in a particular direction. Timing signal train 200 may be repeated at different steering directions of antenna 20. While the timing signals are illustrated as a sequence of individual pulses, those skilled in the art will understand that the information represented by the pulses can be expressed in many forms other than the illustrated pulses.

FIGS. 2a, 2b, 2c, 2d, and 2e together constitute a simplified timing diagram illustrating one sub-timing signal train of timing signal train 200 according to one aspect of the invention, utilizing frequency diversity of the radar pulses, and also illustrating the method for processing, including the frequencies received during certain intervals, and also including how the information from the various received signals is combined to produce the desired unambiguous, uneclipsed range coverage. The sub-timing signal train of FIG. 2a corresponds to sub-timing signal train 200b of FIG. 2. In FIG. 2a, some of the timing signals are illustrated as a set 210s of pulses 210, 212, 214, 216, 218, and 219. These timing signals or pulses may be considered to be representative of the pulses being produced by pulse generator 14 of FIG. 1, or they may be considered to be representative of the radio-frequency pulses produced by RF transmitter 16 of FIG. 1. The pulses 210, 212, 214, 216, 218, and 219 of set 210s have substantially constant amplitude dimension A, thereby suggesting that the transmitted power is substantially constant during each pulse, and from pulse to pulse. Timing in FIG. 2a starts with the leading or left-most edge of pulse 210, and proceeds to the right with increasing time. The duration of pulse 210 is indicated by the Transmit Interval arrow 220 of FIG. 2b, and similarly the durations of pulses 212, 214, 216, 218, and 219 are indicated by the lengths of arrows 222, 224, 226, 228, and 229, respectively. Pulses 210, 212, 214, 216, 218, and 219 are of equal duration.

While the pulses of set 210s of FIG. 2a are of substantially constant amplitude and duration, they may represent pulses which are transmitted at different frequencies. In particular, pulse 210 is designated as "RF1," thereby indicating that the corresponding pulse of electromagnetic radiation transmitted from antenna 20 of FIG. 1 is at a first RF frequency. That is to say, that frequency RF1 is transmitted "on" or during pulse 210. Pulse 212 of FIG. 2a, by contrast, is designated "RF2," thereby indicating that the corresponding transmitted pulse of electromagnetic radiation is at a second frequency, different from the first frequency. Pulse 214 is designated "RF3," pulse 216 is designated "RF4," pulse 218 is designated "RF5,", ..., and pulse 219 is designated "RF(N)," to indicate that the various transmitted pulses are at mutually different frequencies.

While sub-timing-signal train 200b of FIGS. 2 and 2a is shown as having N possible pulses, the minimum number of transmitted pulses, in accordance with an aspect of the invention, is two, with those pulses occurring in a time duration corresponding to three pulse repetition intervals of the sub-timing signal train.

In FIG. 2a, the duration of the interval between pulses varies. More particularly, the duration of the interpulse period or interval 230 between the end of pulse 210 and the beginning of pulse 212 is designated 230 in FIG. 2c. This interpulse interval represents the time during which transmitter 16 of FIG. 1 is not transmitting. In general, a radar system of the type depicted cannot receive return or reflected signals during that time in which it is transmitting. Thus, interpulse interval 230 represents time during which uneclipsed reception can occur. Thus, receiver 28 of FIG. 1 can receive return signals during interval 230 of FIG. 2c. The interpulse period 232 between pulses 212 and 214 of FIG. 2a is smaller than interpulse period 230. Thus, receiver 28 of FIG. 1 can receive return radar signals during intervals 230 and 232 of FIG. 2c, but not during intervals 220 and 222 of FIG. 2b. As illustrated in FIGS. 2a and 2c, the interpulse periods 234, 236, and 238 between pulses 214 and 216, 216 and 218, and 218 and 219, respectively, alternate between long and short intervals equivalent to long interval 230 and short interval 232. The last illustrated interpulse interval 239' of FIG. 2a follows the pulse repetition interval 239 associated with pulse 219. Just as the receiver 28 of FIG. 1 cannot receive return radar signals during pulse 212, it cannot receive return signals during pulses 214, 216, 218, and 219, nor during later-occurring pulses (not illustrated). The times during which reception is not possible due to the transmission of pulses are indicated in FIG. 2b as 222, 224, 226, 228, and 229, respectively. The times during which return signals can be received are indicated in FIG. 2c as 230, 232, 234, 236, 238, and 239.

In the embodiment illustrated in FIG. 2a, the radio frequencies of the pulses transmitted by radar system 10 of FIG. 1 are set forth within each pulse. For example, pulse 210 is transmitted at a radio frequency RF1, pulse 212 is transmitted at a radio frequency RF2, and pulses 214, 216, 218, ..., and 219 are transmitted at radio frequencies RF3, RF4, RF5, ... and $RF_N$, respectively, where the frequencies are sufficiently different from each other so that their return radar signals are identifiable and separable. According to an aspect of the invention, the signals which are selected for reception by receiver 28 of FIG. 1 may not correspond with the frequencies transmitted by the preceding pulse. The interpulse periods during which reception can take place (230, 232, 234, 236, 238, 239, and 239' of FIG. 2c) following each pulse of set 210s of FIG. 2a are indicated by hatching in FIG. 2a. More particularly, RF1 is received in the interpulse period 230 immediately following transmission at RF1 by first pulse 210, RF1 is received in the interpulse period 232 immediately following transmission at RF2 on second pulse, namely pulse 212, RF2 is received during interpulse period 234 immediately following transmission at RF3 on pulse 214, RF3 is received during interpulse period 236 immediately following transmission at RF4 by pulse 216, RF4 is received during interpulse period 238 immediately following transmission at RF5 by pulse 218, . . . , $RF_{N-1}$ is received during interpulse period 239 immediately following transmission at $RF_N$ on pulse 219, and $RF_N$ is received during period 239' following the pulse repetition interval associated with pulse 219.

The radar return signals at the various transmitted radio frequencies (RFs) are received by the receiver 28 of FIG. 1 during interpulse periods, and are converted into digital form and stored for use by processor 12. Thus, processor 12 has available for evaluation the returned signals, if any, from each transmitted pulse illustrated in FIG. 2a. It should be noted that those skilled in the art will understand that there may be no data representing targets in any one, or all, of the received signal segments, but the received data is processed as described herein prior to determining whether a target return exists in the received data, and target detection processing is performed subsequent to the integration processing described herein; parts of this description make reference to data processing that is included to account for the condition where a target return exists. Following the transmission of pulse 210 of FIG. 2a in interval 220 of FIG. 2b, an interpulse period 230 occurs, during which the RF1 radar return signal can be received and stored. This portion of the reception is designated 240 in FIG. 2d, and may extend from the trailing or last edge of pulse 210 of FIG. 2a to near the leading edge of pulse 212. Ideally, the received signal would represent target information to the leading edge of pulse 212, but practical considerations, such as the need to have a full pulse in order to perform pulse compression processing, may limit the performance of the receiver at ranges beyond (to the right of) range $R_A$ in FIG. 2d. Thus, $R_A$ may be taken to be the range limit for reception of received signal originating from pulse 210. For somewhat the same reasons, the minimum range ($R_{MIN}$) of the radar is likely to occur at a range slighty after (or to the right of) the end (the rightmost edge) of the first pulse 210. The range represented by information contained in the received radar signal at frequency RF1 is represented by the range between range $R_{MIN}$ of FIG. 2d and range $R_A$ of FIG. 2d. The receiver 28 of FIG. 1 continues to receive radar return signals at RF1, if present, during the interval designated 242 in FIG. 2d. That is to say, the signal reception at the first frequency RF1 continues even after the transmission of the second pulse, which is to say pulse 212, which transmission is at frequency RF2. Since any return signals originating from pulse 212 will be at frequency RF2, reception by receiver 28, being limited during interval 232 to reception at frequency RF1, will not respond to target returns originating from pulses transmitted at frequency RF2. In other words, the receiver 28 separates out the RF1 signals for coupling to the processor 12 even after the transmission of pulse 212 at RF2. Processor 12 at this point in the operation has data relating to the presence or absence of targets in ranges $R_{MIN}$ to $R_A$, and from $R_B$ to $R_{MAX}$, where $R_{MAX}$ represents the maximum unambiguous uneclipsed range coverage desired. It is necessary only to provide information relating to the presence or absence of targets in range interval $R_A$ to $R_B$, corresponding to the range of eclipsing by pulse 212, and to provide a sufficient number of pulses so that the desired detection sensitivity from $R_{MIN}$ to $R_{MAX}$ is achieved.

In order to fill in the information relating to range interval $R_A$ to $R_B$, receiver 28 of FIG. 1 is retuned following transmission at frequency RF3 on pulse 214 of FIG. 2a, so as to respond to frequency RF2, previously transmitted by pulse 212. This reception interval is designated 234 in FIG. 2C. It will be noted that not all of the return signal resulting from, or originating with, pulse 212 of FIG. 2d is available to the receiver 28 of FIG. 1. More particularly, that portion of the return signals at RF2 that closely follows pulse 212, i.e. during receive interval 232 of FIG. 2c and transmit interval 224 of FIG. 2b, are not received at all. The range segment corresponding to the target information missing from the return signals at frequency RF2 is the range segment $R_{MIN}$ to $R_A$. While this range segment is missing from the return signal at frequency RF2, the information is already available from the return signals at RF1 obtained during receive interval 230 if FIG. 2c. The return signal information at frequency RF2 (receive interval 234 of FIG. 2C) corresponds to range segment $R_A$ to $R_{MAX}$, and is illustrated as 244 in FIG. 2d. This information, when received and digitized, is processed or stored and processed, as appropriate, to (a) fill in the target information for range $R_A$ to $R_B$, and (b) to integrate or add to the information already available relating to range interval $R_B$ to $R_{MAX}$. Thus, target information is now available for the entire interval $R_{MIN}$ to $R_{MAX}$. If pulses 210 and 212 provide the desired total transmitted energy required to give the desired detection sensitivity for the set maximum range, then the transmission of the third pulse (214) in the sub-timing signal train frequency RF3 is not required and the sub-timing signal train terminates following the third interpulse period (i.e., interpulse period 214 in FIG. 2a); However, if further total transmitted energy is required to give the desired detection sensitivity to the set maximum range, then additional pulses may be provided in the sub-timing signal train.

Additional transmitted pulses may be included for additional detection sensitivity if desired or needed, as illustrated in FIG. 2a. After reception by receiver 28 of FIG. 1 of the maximum-range portion of return signal at frequency RF2, and after pulse 216 of FIG. 2a is transmitted, receiver 28 can be retuned to receive return signal at frequency RF3, previously transmitted by pulse 214. The return signals at RF3 are received during the interpulse period 236 lying between pulses 216 and 218. Interpulse period 236 is shorter than interpulse period 234, however, and cannot provide target information over as great a range. The range corresponding to the information attributable to reception during interpulse interval 236 of return signals at frequency RF3 is designated 246, and extends from range $R_B$ to $R_{MAX}$. Processing of the RF3 signal together with the RF1 and RF2 signals provides integration of (or with) the signal in range segment 242 of FIG. 2d, but does not provide integration of the signal in range segment 244 extending from $R_A$ to $R_B$. Additional transmitted pulses are illustrated in FIG. 2a. Following transmission at frequency RF5 on pulse 218 of FIG. 2a, the receiver can be retuned to receive return signals at frequency RF4 in the interpulse period 238. The duration of interpulse period 238 corresponds to range interval 248 of FIG. 2d, extending from range $R_A$ to range $R_{MAX}$. The RF4 signals can be processed together with the other received signals to provide additional signal integration in the range interval $R_A$ to $R_{MAX}$. Additional pulses may be processed in the same manner. The last transmitted pulse in the sequence is illustrated as pulse 219 of FIG. 2a, transmitting at frequency $RF_N$. Immediately following pulse 219, the receiver is retuned to the immediately prior transmitted frequency, which is frequency $RF_{N-1}$, and the return signals are received during interpulse interval 239. The signals received at frequency $RF_{N-1}$ during interpulse interval 239 represent target information in the range interval $R_B$ to $R_{MAX}$ which may be integrated with prior received information. The last step before re-steering of the antenna is to take advantage of the return signal arising from transmission of signal at frequency $RF_N$ on pulse 219. This is accomplished by retuning the receiver to frequency $RF_N$ during interpulse interval 239'. The signals received at frequency $RF_N$ during interpulse period 239' represent target information in the range interval $R_A$ to $R_{MAX}$, and are represented by range segment 249 of FIG. 2d. The information for range segment 249, when combined with prior-received information, provides additional signal integration. Those skilled in the art will understand that the above described integration is fully effective only if the beam of antenna 20 of FIG. 1 is steered in the same direction during the entire pulse sequence, otherwise disparate information will be combined, with no particular benefit.

The integrated result over the sub-timing signal is an uneclipsed radar range illustrated in FIG. 2d as 250, extending from $R_{MIN}$ to $R_{MAX}$, where $R_{MAX}$ is the desired maximum unambiguous uneclipsed range. FIG. 2e provides an overview of the integration methodology described in conjunction with FIGS. 2a, 2b, 2c, and 2d as well as how the integration may be extended across sub-timing signal trains 200a, 200b, . . . , 200M within timing signal train 200 of FIG. 2. In FIG. 2e, the integration within a sub-timing signal train (i.e., the integration described in conjunction with FIGS. 2a, 2b, 2c, and 2d) is referred to as the intra-sub-timing signal train integration, and the integration across sub-timing signal trains 200a, 200b, . . . , 200M within timing signal train 200 of FIG. 2 is referred to as the inter-sub-timing signal train integration. Since the number of transmitted pulses need not be the same within each of the sub-timing signal trains 200a, 200b, . . . , 200M, the number of transmitted pulses associated with sub-timing signal trains 200a, 200b, . . . , 200M are listed in FIG. 2e as $N_1$, $N_2$, and $N_M$, respectively. In the range interval $R_{MIN}$ to $R_A$ shown in FIG. 2d, a return signal is received from one transmitted pulse per sub-timing signal train; therefore, there is no intra-sub-timing signal integration in range interval $R_{MIN}$ to $R_A$. However, there are M inter-sub-timing signal train non-coherent integrations in range interval $R_{MIN}$ to $R_A$. In the range interval $R_A$ to $R_B$ shown FIG. 2d, data is received (when a target is present) from about $N_i/2$ transmitted pulses per sub-timing signal train, where i represents the sub-timing signal train number (i.e., 1,2, . . . , or M). Therefore, there is up to $N_i/2$ intra-sub-timing signal non-coherent integrations in range interval $R_A$ to $R_B$ where i represents the sub-timing signal train number (i.e., 1,2, . . . , or M). In addition, there are M inter-sub-timing signal train non-coherent integrations in range interval $R_A$ to $R_B$. In the range interval $R_B$ to $R_{MAX}$ shown FIG. 2d, there is up to $N_i$ intra-sub-timing signal non-coherent integrations where i represents the sub-timing signal train number (i.e., 1,2, . . . , or M). In addition, there are M inter-sub-timing signal train non-coherent integrations in range interval $R_B$ to $R_{MAX}$. This integration pattern results in an integrated radar return signal-to-noise ratio versus range relationship that is very different from the range$^4$ signal-to-noise ratio reduction encountered in conventional radar systems.

After the process described in conjunction with FIGS. 2a, 2b, 2c, 2d, and 2e, the antenna 20 of FIG. 1 may be re-steered to a different direction, and the radar sequence is repeated to obtain target-related information in the new direction. The radar sequence in this direction may have a different number of sub-timing signal trains per timing signal train and pulse repetition intervals per sub-timing signal train relative to the radar sequence in the earlier direction. The method as described in conjunction with FIGS. 2a, 2b, 2c, 2d, and 2e is not subject to eclipsing because the eclipsed information is filled in, and there is no range ambiguity because the receiver retuning always identifies the pulse from which the received signal originates.

Figure 3:
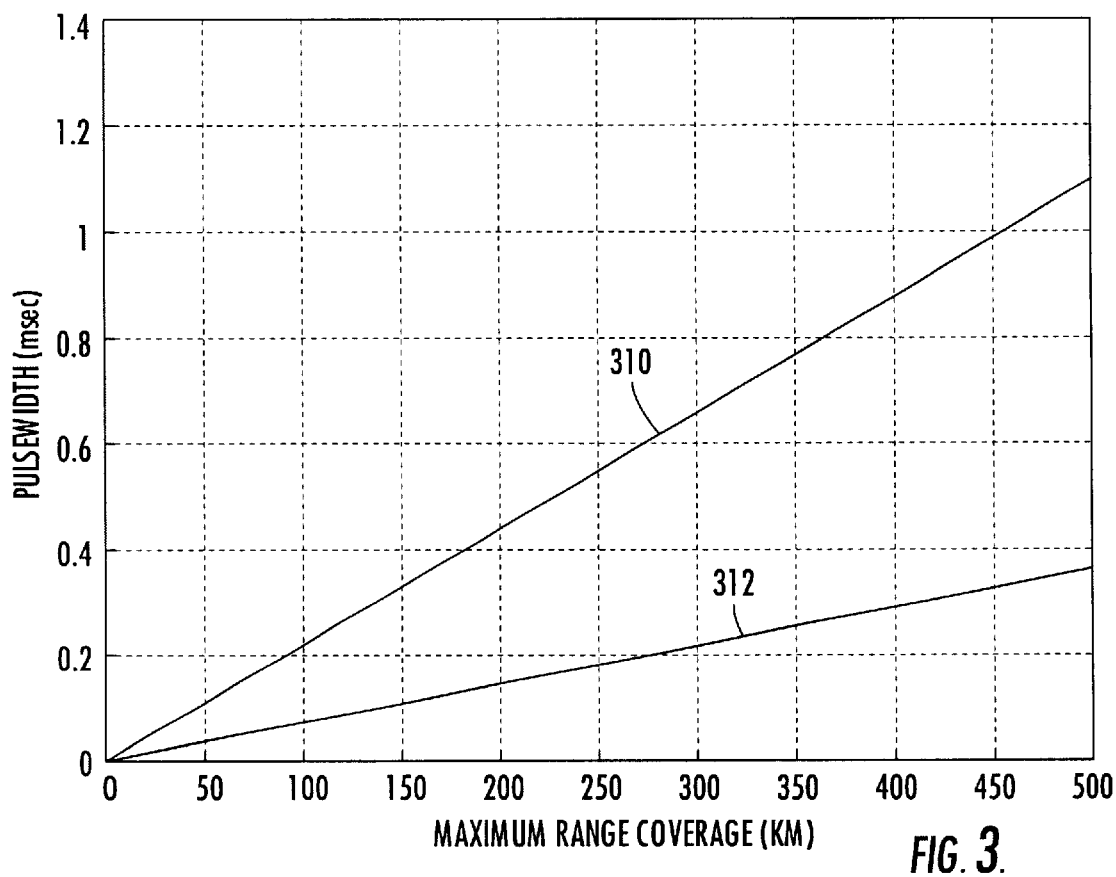
FIG. 3 is a plot of transmitted pulsewidth as a function of maximum unambiguous range coverage according to one aspect of the invention compared to a conventional radar approach.

In FIG. 3, plots 310 and 312 illustrate an example of the required pulsewidth for a radar utilizing the process described in conjunction with FIGS. 1, 2, 2a, 2b, 2c, 2d, and 2e, as compared to a conventional unambiguous pulse method, to meet the same level of performance. Plot 310 represents the pulsewidth versus maximum unambiguous range coverage of a conventional unambiguous pulse radar system, and plot 312 similarly represents a radar system such as that described in conjunction with FIGS. 1, 2a, 2b, 2c, and 2d. For any given maximum range, the arrangement according to the invention, represented by plot 312, requires a shorter pulse width than the conventional radar system. Those skilled in the art will recognize that a shorter pulse width is desirable since it reduces the radar power consumption, heat dissipation, and losses relative to a radar system that employs longer pulse widths.

As so far described in conjunction with FIGS. 2a, 2b, 2c, and 2d, the integration suggested by arrow 252 must be noncoherent, because the signals being integrated from the various sets of return signals are (for the most part) derived from different frequencies. Coherent integration (derived from information originating with a single frequency) can be more efficient than noncoherent, and it may be advantageous to be able to provide coherent integration over at least a portion of the range. One of the difficulties with coherent processing is that of maintaining coherency of the target return over the duration of the interval between pulses being coherently integrated, as a result of which it is desirable to derive the return signals to be coherently processed from closely spaced (in time) pulses. FIG. 4 illustrates the processing associated with an embodiment of the invention that employs coherent processing.

FIG. 4 is a simplified timing diagram illustrating a timing signal train 400 which may be produced by pulse generator 14 of FIG. 1 in accordance with an aspect of the invention. In FIG. 4, timing signal train 400 is broken into a sequence of sub-timing-signal trains designated 400a, 400b, . . . , 400M, where M is greater than or equal to one. Timing signal train 400 of FIG. 4 represents the timing signals which are generated by pulse generator 14 during the time when the antenna 20 is steered in a particular direction. Timing signal train 400 may be repeated at different steering directions of antenna 20. While the timing signals are illustrated as a sequence of individual pulses, those skilled in the art will understand that the information represented by the pulses can be expressed in many forms other than the illustrated pulses.

FIGS. 4a, 4b, 4c, 4d, and 4e together constitute a simplified timing diagram illustrating one sub-timing signal train of timing signal train 400 according to an aspect of the invention, and also illustrating the method for processing, including the frequencies received during certain intervals, and also including how the information from the various received signals is combined to produce the desired unambiguous, uneclipsed range coverage. The sub-timing signal train of FIG. 4a corresponds to sub-timing signal train 400b of FIG. 4. In FIG. 4a, some of the timing signals are illustrated as a set 410s of pulses 410, 412, 414, 416, 418, and 419. These timing signals or pulses may be considered to be representative of the pulses being produced by pulse generator 14 of FIG. 1, or they may be considered to be representative of the radio-frequency pulses produced by RF transmitter 16 of FIG. 1. The pulses 410, 412, 414, 416, 418, and 419 of set 410s have substantially constant amplitude dimension A, thereby suggesting that the transmitted power is substantially constant during each pulse, and from pulse to pulse. Timing in FIG. 4a starts with the leading or left-most edge of pulse 410, and proceeds to the right with increasing time. The duration of pulse 410 is indicated by the Transmit Interval arrow 420 of FIG. 4b, and similarly the durations of pulses 412, 414, 416, 418, and 419 are indicated by the lengths of arrows 422, 424, 426, 428, and 429, respectively. Pulses 410, 412, 414, 416, 418, and 419 are of equal duration.

While the pulses of set 410s of FIG. 4a are of substantially constant amplitude and duration, they may represent pulses which are transmitted at different frequencies; however, frequencies may be repeated to realize coherent integration. In particular, pulse 410 is designated as "RF1," thereby indicating that the corresponding pulse of electromagnetic radiation transmitted from antenna 20 of FIG. 1 is at a first RF frequency. That is to say, that frequency RF1 is transmitted "on" or during pulse 410. Pulse 412 of FIG. 4a, by contrast, is designated "RF2," thereby indicating that the corresponding transmitted pulse of electromagnetic radiation is at a second frequency, different from the first frequency. Pulse 414 is designated "RF1," pulse 416 is designated "RF2," pulse 418 is designated "RF1,", . . . , and pulse 419 is designated "RF2," to indicate that the various transmitted pulses are at pairwise different frequencies, but every other pulse is at the same frequency within the sub-timing signal train.

While sub-timing-signal train 400b of FIGS. 4 and 4a is shown as having N possible pulses, the minimum number of transmitted pulses to take advantage of coherent integration in some range interval, in accordance with an aspect of the invention, is three, with those pulses occurring in a time duration corresponding to four pulse repetition intervals of the sub-timing signal train.

In FIG. 4a, the duration of the interval between pulses varies in the same manner as the duration of the interval between pulses in FIG. 2a. More particularly, the duration of the interpulse period or interval 430 between the end of pulse 410 and the beginning of pulse 412 is designated 430 in FIG. 4c. This interpulse interval represents the time during which transmitter 16 of FIG. 1 is not transmitting. In general, a radar system of the type depicted cannot receive return or reflected signals during that time in which it is transmitting. Thus, interpulse interval 430 represents time during which uneclipsed reception can occur. Thus, receiver 28 of FIG. 1 can receive return signals during interval 430 of FIG. 4c. The interpulse period 432 between pulses 412 and 414 of FIG. 4a is smaller than interpulse period 430. Thus, receiver 28 of FIG. 1 can receive return radar signals during intervals 430 and 432 of FIG. 4c, but not during intervals 420 and 422 of FIG. 4b. As illustrated in FIGS. 4a and 4c, the interpulse periods 434, 436, and 438 between pulses 414 and 416, 416 and 418, and 418 and 419, respectively, alternate between long and short intervals equivalent to long interval 430 and short interval 432. The last illustrated interpulse interval 439' of FIG. 4a follows the pulse repetition interval 439 associated with pulse 419. Just as the receiver 28 of FIG. 1 cannot receive return radar signals during pulse 412, it cannot receive return signals during pulses 414, 416, 418, and 419, nor during later-occurring pulses (not illustrated). The times during which reception is not possible due to the transmission of pulses are indicated in FIG. 4b as 422, 424, 426, 428, and 429, respectively. The times during which return signals can be received are indicated in FIG. 4c as 430, 432, 434, 436, 438, and 439.

In the embodiment illustrated in FIG. 4a, the radio frequencies of the pulses transmitted by radar system 10 of FIG. 1 are alternated from pulse-to-pulse. For example, pulse 410 is transmitted at a radio frequency RF1, pulse 412 is transmitted at a radio frequency RF2, and pulses 414, 416, 418, . . . , and 419 are transmitted at radio frequencies RF1, RF2, RF1, . . . and RF2, respectively, where the frequencies RF1 and RF2 are sufficiently different from each other so that their return radar signals are identifiable and separable. According to an aspect of the invention, the signals which are selected for reception by receiver 28 of FIG. 1 may not correspond with the frequencies transmitted by the preceding pulse. The interpulse periods during which reception can take place (430, 432, 434, 436, 438, 439, and 439' of FIG. 4c) following each pulse of set 410s of FIG. 4a are indicated by hatching in FIG. 4a. More particularly, RF1 is received in the interpulse period 430 immediately following transmission at RF1 by first pulse 410, RF1 is received in the interpulse period 432 immediately following transmission at RF2 on second pulse, namely pulse 412, RF2 is received during interpulse period 434 immediately following transmission at RF1 on pulse 414, RF1 is received during interpulse period 436 immediately following transmission at RF2 by pulse 416, RF2 is received during interpulse period 438 immediately following transmission at RF5 by pulse 418, . . . , RF1 is received during interpulse period 439 immediately following transmission at RF2 on pulse 419, and RF2 is received during period 439' following the pulse repetition interval associated with pulse 419.

The radar return signals at the transmitted radio frequencies are received by the receiver 28 of FIG. 1 during interpulse periods, and are converted into digital form and stored for use by processor 12. Thus, processor 12 has available for evaluation the returned signals, if any, from each transmitted pulse illustrated in FIG. 4a. It should be noted that those skilled in the art will understand that there may be no data representing targets in any one, or all, of the received signal segments, but the received data is processed as described herein prior to determining whether a target return exists in the received data, and target detection processing is performed subsequent to the integration processing described herein; parts of this description make reference to data processing that is included to account for the condition where a target return exists. Following the transmission of RF1 pulse 410 of FIG. 4a in interval 420 of FIG. 4b, an interpulse period 430 occurs, during which the RF1 radar return signal can be received and stored. This portion of the reception is designated 440 in FIG. 4d, and may extend from the trailing or last edge of pulse 410 of FIG. 4a to near the leading edge of pulse 412. As mentioned, the received signal would ideally represent target information to the leading edge of pulse 412, but practical considerations, such as the need to have a full pulse in order to perform pulse compression processing, may limit the performance of the receiver at ranges beyond (to the right of) range $R_A$ in FIG. 4d. Thus, $R_A$ may be taken to be the range limit for reception of received signal originating from pulse 410. For somewhat the same reasons, the minimum range ($R_{MIN}$) of the radar is likely to occur at a range slightly after (or to the right of) the end (the rightmost edge) of the first pulse 410. The range represented by information contained in the received radar signal at frequency RF1 is represented by the range between range $R_{MIN}$ of FIG. 4d and range $R_A$ of FIG. 4d. The receiver 28 of FIG. 1 continues to receive radar return signals at RF1, if present, during the interval designated 442 in FIG. 4d. That is to say, the signal reception at the first frequency RF1 continues even after the transmission of the second pulse, which is to say pulse 412, which transmission is at frequency RF2. Since any return signals originating from pulse 412 will be at frequency RF2, reception by receiver 28, being limited during interval 432 to reception at frequency RF1, will not respond to target returns originating from pulses transmitted at frequency RF2. In other words, the receiver 28 separates out the RF1 signals for coupling to the processor 12 even after the transmission of pulse 412 at RF2. Processor 12 at this point in the operation has data relating to the presence or absence of targets in ranges $R_{MIN}$ to $R_A$, and from $R_B$ to $R_{MAX}$ where $R_{MAX}$ represents the maximum unambiguous uneclipsed range coverage desired. It is necessary only to provide information relating to the presence or absence of targets in range interval $R_A$ to $R_B$, corresponding to the range of eclipsing by pulse 412, and to provide a sufficient number of pulses so that the desired detection sensitivity from $R_{MIN}$ to $R_{MAX}$ is achieved.

In order to fill in the information relating to range interval $R_A$ to $R_B$, receiver 28 of FIG. 1 is retuned following transmission at frequency RF1 on pulse 414 of FIG. 4a, so as to respond to frequency RF2, previously transmitted by pulse 412. This reception interval is designated as 343 in FIG. 4c. It will be noted that not all of the return signal resulting from, or originating with, pulse 412, of FIG. 4d is available to the receiver 28 of FIG. 1. More particularly, that portion of the return signals at RF2 which closely follow pulse 412, i.e. during receive interval 430 of FIG. 4c and transmit interval 424 of FIG. 4b, is not received at all. The range segment corresponding to the target information missing from the return signals at frequency RF2 is the range segment $R_{MIN}$ to $R_A$. While this range segment is missing from the return signal at frequency RF2, the information is already available from the return signals at RF1 obtained during receive interval 430 of FIG. 4c. The return signal information at frequency RF2 (434 of FIG. 4c) corresponds to range segment $R_A$ to $R_{MAX}$, and is illustrated as 444 in FIG. 4d. This information, when received and digitized, is processed or stored and processed, as appropriate, to (a) fill in the target information for range $R_A$ to $R_B$, and (b) to integrate or add to the information already available relating to range interval $R_B$ to $R_{MAX}$. Thus, target information is now available for the entire interval $R_{MIN}$ to $R_{MAX}$. If pulses 410 and 412 provide the desired total transmitted energy required to give the desired detection sensitivity for the set maximum range, then the transmission of the third pulse in the sub-timing signal train frequency RF1 is not required and the sub-timing signal train terminates following the third interpulse period (i.e., interpulse period 414 in FIG. 4a). This then reduces to the embodiment described in FIGS. 2, 2a, 2b, 2c, 2d, and 2e. However, if further total transmitted energy is required to give the desired detection sensitivity to the set maximum range, then additional pulses may be provided in the sub-timing signal train.

Additional pulses may be included for additional detection sensitivity if desired or needed, as illustrated in FIG. 4a. After reception by receiver 28 of FIG. 1 of the maximum-range portion of return signal at frequency RF2, and after pulse 416 of FIG. 2a is transmitted, receiver 28 can be retuned to receive return signal at frequency RF1, previously transmitted by pulse 414. The return signals at RF1 are received during the interpulse period 436 between pulses 416 and 418. Interpulse period 436 is shorter than interpulse period 434, however, and cannot provide target information over as great a range. The ranges corresponding to the information attributable to reception during interpulse interval 436 of return signals at frequency RF1 is designated 446 in FIG. 4a, and extends from range $R_B$ to $R_{MAX}$. Coherent processing of the RF1 returns (a) originating from pulse 414 and received during interval 436 with (b) the RF1 returns originating from pulse 410 and received during interval 432 provides data in the range segment from $R_B$ to $R_{MAX}$. Additional transmitted pulses are illustrated in FIG. 4a. Following transmission at frequency RF1 on pulse 418 of FIG. 4a, the receiver can be retuned in the interpulse period 438 to receive return signals at frequency RF2. The duration of interpulse period 438 corresponds to range interval 448 of FIG. 4d, extending from range $R_A$ to range $R_{MAX}$. The RF2 returns from pulse 416 can be processed together with the other received signals to provide additional signal integration (both coherent and non-coherent) in the range interval $R_A$ to $R_{MAX}$. Additional pulses may be processed in the same manner. The last transmitted pulse in the sequence is illustrated as pulse 419 of FIG. 4a, transmitting at frequency RF2. Immediately following pulse 419, the receiver is retuned to the immediately prior transmitted frequency, which is frequency RF1 and the return signals are received during interpulse interval 439. The signals received at frequency RF1 during interpulse interval 439 represent target information in the range interval $R_B$ to $R_{MAX}$ which may be integrated with prior received information. The last step before re-steering of the antenna is to take advantage of the return signal arising from transmission of signal at frequency RF2 on pulse 419. This is accomplished by retuning the receiver to frequency RF2 during interpulse interval 439'. The signals received at frequency RF2 from pulse 419 during interpulse period 439' represent target information in the range interval $R_A$ to $R_{MAX}$, and are represented by range segment 449 of FIG. 4d. The information for range segment 449, when combined with prior-received information, provides additional signal integration (both coherent and non-coherent). Those skilled in the art will understand that the above described integration is fully effective only if the beam of antenna 20 of FIG. 1 is steered in the same direction during the entire pulse sequence, otherwise disparate information will be combined, with no particular benefit.

The integrated result over the sub-timing signal is an uneclipsed radar range illustrated in FIG. 4d as 450, extending from $R_{MIN}$ to $R_{MAX}$, where $R_{MAX}$ is the desired maximum unambiguous uneclipsed range. FIG. 4e is an overview of the integration methodology described in conjunction with FIGS. 4a, 4b, 4c, and 4d and indicates how the integration may be extended across sub-timing signal trains 400a, 400b, . . . , 400M within timing signal train 400 of FIG. 4. In FIG. 4e, the integration within a sub-timing signal train (i.e., the integration described in conjunction with FIGS. 4a, 4b, 4c, and 4d) is referred to as the intra-sub-timing signal train integration, and the integration across sub-timing signal trains 400a, 400b, . . . , 400M within timing signal train 400 of FIG. 4 is referred to as the inter-sub-timing signal train integration. Since the number of transmitted pulses need not be the same within each of the sub-timing signal trains 400a, 400b, . . . , 400M, the number of transmitted pulses associated with sub-timing signal trains 400a, 400b, ..., 400M are listed FIG. 4e as $N_1$, $N_2$, and $N_M$, respectively. In the range interval $R_{MIN}$ to $R_A$ shown FIG. 4d, a return signal is received from one transmitted pulse per sub-timing signal train; therefore, there is no intra-sub-timing signal integration in range interval $R_{MIN}$ to $R_A$. However, there are M inter-sub-timing signal train non-coherent integrations in range interval $R_{MIN\ to\ RA}$. In the range interval $R_A$ to $R_B$ shown in FIG. 4d, a return signal is received from about $N_i/2$ transmitted pulses per sub-timing signal train where i represents the sub-timing signal train number (i.e., 1,2, ..., or M). Therefore, there is up to $N_i/2$ intra-sub-timing signal coherent integrations in range interval $R_A$ to $R_B$ where i represents the sub-timing signal train number (i.e., 1,2, ..., or M). In addition, there are M inter-sub-timing signal train non-coherent integrations in range interval $R_A$ to $R_B$. In the range interval $R_B$ to $R_{MAX}$ shown in FIG. 4d, a return signal is received from $N_i$ transmitted pulses per sub-timing signal train where i represents the sub-timing signal train number (i.e., 1,2, ..., or M). Approximately half of the received signals are at one frequency while the other half are at another frequency.

Therefore, there are two sets of up to $N_i/2$ intra-sub-timing signal coherent integrations that can be noncoherently integrated in range interval $R_B$ to $R_{MAX}$ where i represents the sub-timing signal train number (i.e., 1,2, ..., or M). In addition, there are M inter-sub-timing signal train non-coherent integrations in range interval $R_B$ to $R_{MAX}$. This integration pattern tends to counter the natural range[4] signal power reduction ordinarily encountered in radar systems.

After the process described in conjunction with FIGS. 4a, 4b, 4c, 4d, and 4e, the antenna 20 of FIG. 1 may be re-steered toga different direction, and the radar sequence is repeated to obtain target-related information in the new direction. The radar sequence in this direction may have a different number of sub-timing signal trains per timing signal train and pulse repetition intervals per sub-timing signal train relative to the radar sequence in the earlier direction. The method as described in conjunction with FIGS. 4a, 4b, 4c, 4d, and 4e is not subject to eclipsing because the eclipsed information is filled in, and there is no range ambiguity out to a set maximum range because the receiver retuning always identifies the pulse from which the received signal originates.

The ratio of the alternating repetition interval of the embodiment of the invention represented by FIGS. 2a, 2b, 2c, 2d, and 2e, and the embodiment of the invention represented by FIGS. 4a, 4b, 4c, 4d, and 4e may be characterized by one of a $\beta:1$ and a $1:\beta$ ratio of (a) the duration from the start time of a given first pulse repetition interval to the start time of a second pulse repetition interval, said second pulse repetition interval next following said first pulse repetition interval, divided by (b) the duration from the start time of said second pulse repetition interval to the start time of a third pulse repetition interval next following said second pulse repetition interval, where $\beta$ is given by $1+(\alpha D)$, where $\alpha$ is equal to or greater than unity and D is the duty cycle of the radar. Factor $\alpha$ is a dimensionless factor related to the time associated with (a) the transmitted pulse width, together with (b) the amount of signal processing that can be supported within the range eclipsed region. If signal processing can be supported throughout the eclipsed region, the value of $\alpha$ will be unity (1). If signal processing can not be supported in the eclipsed region, then $\alpha$ will have a minimum value of 2. The value of $\alpha$ may typically range between 1 and 2, but it must be realized that values exceeding 2 may be used, if desired. Such values may yield no better performance than values between 1 and 2. Assuming that extrinsic factors limit the maximum duty cycle of a radar system to 0.25, for example, so that D=0.25, and that the value of $\alpha$ is selected to be 2, then $\beta=1+(\alpha D)$ will correspond with $1+(2\times0.25)=1.5$. That is to say, that the duration of a given pulse repetition interval will be 1.5 times the duration of the next following pulse repetition interval or vice versa. Translating this to the situation of FIGS. 2a, 2b, and 2c, then, requires that the total duration of the sum of pulse duration 220 and interpulse period 230 be 1.5 times the duration of the sum of pulse duration 222 together with interpulse period 232. Similarly, the sum of the duration 222 of pulse 214 together with the duration of interpulse period 234 should be 1.5 times longer than the sum of the duration 226 of pulse 216 together with the duration 236 of the interpulse period following pulse 216. The above example can be similarly applied to situation of FIGS. 4a, 4b, and 4c.

The present invention may be embodied in the form of computer-implemented processes and apparatus for practicing those processes. The present invention may also be embodied in the form of computer program code and associated hardware/firmware circuitry and embodied in tangible media, such as floppy diskettes, random access memories (RAMs), read only memories (ROMs), CD-ROMS, hard drives, "ZIP™" or "JAZ™" disks, DVDs, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configure the processor to create specific logic circuits.

Other embodiments of the invention will be apparent to those skilled in the art. For example, while the pulse amplitudes have been described as being substantially constant from pulse to pulse, this is not a requirement of the invention. Also, while $R_A$ of FIG. 2d and 4d has been indicated as the limit for reception, some types of receivers and processing may make it possible to extend range $R_A$ virtually to range $R_A'$ of FIG. 2d. While in principle the antenna should not be re-steered during the transmission and reception associated with a given timing signal train from which target information is to be extracted, those skilled in the art know that some antenna re-steering may be permitted during the process. While it was mentioned that following timing signal train 200 of FIG. 2 at one beam position that a second timing signal train as described in FIG. 2 may be employed at a different beam position, the second timing signal train can instead be as described in FIG. 4. Similarly, while it was mentioned that following timing signal train 400 of FIG. 4 at one beam position that a second timing signal train as described in FIG. 4 may be employed at a different beam position, the second timing signal train can instead be as described in FIG. 2. While the arrangement of FIGS. 4, 4a, 4b, 4c, 4d, and 4e allows coherent integration, this arrangement could be used with all non-coherent integration, if desired.

What is claimed is:

1. A method for transmitting and receiving radar signals, said method comprising:

transmitting time-sequential pulses including first and second pulses at first and second mutually different frequencies, said first and second pulses being separated by a first time duration;

receiving radar return signals at said first frequency during times corresponding to said first time duration and during a second time duration that begins after transmission of the second pulse, which second time duration is different from said first time duration, and also receiving said second frequency during a third time duration; and processing said radar return signals to provide signals representative of targets lying in an uneclipsed range nominally corresponding to the sums of (a) the sum of said first and second time durations and (b) the duration of said second pulse.

2. A method according to claim 1, wherein said second time duration is less than said first time duration.

3. A method according to claim 1, wherein said third time duration follows said first and second time durations.

4. A method according to claim 1, further comprising:

transmitting additional pulses at additional frequencies, which additional frequencies are different from each other and from said first and second frequencies, said additional pulses being transmitted following said second pulse, and at least some of said additional pulses being transmitted later than the immediately preceding pulse by alternating ones of said first and second time durations; and receiving radar return signals at a frequency corresponding to one of said additional frequencies during a time interval which begins at a time following that pulse on which said one of said additional frequencies was transmitted by the sum of (a) one of said first and second time durations and (b) a pulse duration.

5. A method according to claim 4, further comprising:

processing said radar return signals at said additional frequencies together with at least some of said radar return signals at said first and second frequencies to produce said signals representative of targets.

6. A method according to claim 4, further comprising, with a particular antenna pointing, repeating a particular number of times said steps of transmitting time-sequential pulses, receiving radar return signals, transmitting additional pulses at additional frequencies, receiving radar return signals at said additional frequencies, and processing said radar return signals.

7. A method for transmitting and receiving radar signals, said method comprising the steps, with the radar antenna pointed in a particular direction, of:

generating a timing signal train including at least one sub-timing signal train, each of said sub-timing signal trains including at least first, second and third alternating and sequential pulse repetition intervals characterized by one of a $\beta:1$ and a $1:\beta$ ratio of (a) the duration from the start time of a given first pulse repetition interval to the start time of a second pulse repetition interval, said second pulse repetition interval next following said first pulse repetition interval, divided by (b) the duration from the start time of said second pulse repetition interval to the start time of a third pulse repetition interval next following said second pulse repetition interval, where $\beta$ is given by $1+(\alpha D)$, where $\alpha$ is equal to or greater than unity, and D is the duty cycle of the radar;

in response to each said sub-timing signal train, transmitting electromagnetic radar pulses from said antenna such that the frequency of transmission in response to the first pulse of said sub-timing signal train is at a first radio frequency and the frequency of transmission in response to the second pulse of said sub-timing signal train is at a second radio frequency, different from said first radio frequency by an amount which allows subsequent separation;

receiving, during that interpulse period immediately following said first pulse, electromagnetic radar return signals originating in response to said first pulse, to thereby generate first received signals;

receiving, during that interpulse period immediately following said second pulse, electromagnetic radar return signals originating in response to said first pulse, to thereby generate second received signals;

receiving, during said third pulse repetition interval, electromagnetic radar return signals originating in response to said second pulse, to thereby generate third received signals;

concatenating said first and second received signals, with a delay therebetween no less than the duration of said second pulse, to thereby produce a concatenated return signal originating from said first radio frequency pulse, which includes information relating to the presence or absence of targets in an unambiguous range interval extending from the end of said first pulse to near the beginning of said second pulse, and extending from the end of said second pulse to near the beginning of said third pulse repetition interval, but does not include information relating to the presence or absence of targets attributable to signals received during transmission of said second pulse;

delaying said third received signals by a time duration equal to the said second pulse repetition interval, to thereby produce a delayed third return signal including information relating to the presence or absence of targets in the interval which coincides with ranges extending at least from the beginning of said second pulse to near the beginning of said third pulse repetition interval relative to the start of said sub-pulse train; and combining the information from said concatenated return signal with the information from said delayed return signal to thereby produce signals representing the presence or absence of targets in the interval extending from said end of said first pulse to near said beginning of said third pulse repetition interval range unambiguously and range uneclipsed.

8. A method according to claim 7, wherein said combining includes the step of integrating.

9. A method according to claim 7, wherein:

said sub-timing-signal train includes N+1 pulse repetition intervals where N is greater than or equal to two, N pulses of electromagnetic radiation are transmitted during the first N of said N+1 pulse repetition intervals, each at a different RF frequency; and said combining includes the step of noncoherent integration.

10. A method according to claim 7, wherein:

said sub-timing-signal train includes N+1 pulse repetition intervals where N is greater than or equal to two;

N pulses of electromagnetic radiation are transmitted during the first N of said N+1 pulse repetition intervals, wherein each pulse following the first two pulses represents transmission of electromagnetic energy at a frequency equal to that of the pulse transmitted two pulse repetition intervals earlier; and said combining includes at least one of the steps of (a) coherent and (b) noncoherent integration.

11. A method according to claim 9, wherein: said timing signal train includes M of said sub-timing signal trains where M is greater than or equal to one, the number of pulse repetition intervals in each of said sub-timing signal trains need not be equal, and said combining includes at least one of the steps of (a) coherent integration and (b) non-coherent integration.

12. A method according to claim 11, further including the step of re-steering the said antenna following the generation of said timing signal train: and generating a second timing signal train according to claim 12 that need not have the same number of said sub-timing signal trains nor the same number of said pulse repetition intervals per said sub-pulse train as earlier said timing signal train nor the same method of said combining.

13. A method according to claim 10, wherein: said timing signal train includes M of said sub-timing signal trains where M is greater than or equal to one, the number of pulse repetition intervals in each of said sub-timing signal trains need not be equal, and said combining includes the step of coherent and/or non-coherent integration.

14. A method according to claim 13, further including the step of re-steering the said antenna following the generation of said timing signal train: and generating a second timing signal train that need not have the same number of said sub-timing signal trains nor the same number of said pulse repetition intervals per said sub-pulse train as earlier said timing signal train nor the same method of said combining.

15. A method according to claim 1, wherein the third time duration is equal to that of the first time duration.

16. A system for transmitting and receiving radar signals, said system comprising:

a transmitter operative for transmitting time-sequential pulses including first and second pulses at first and second mutually different frequencies, said first and second pulses being separated by a first time duration;

a receiver operative for receiving radar return signals at said first frequency during times corresponding to said first time duration and during a second time duration that begins after transmission of the second pulse, which second time duration is different from said first time duration, and also receiving said second frequency during a third time duration; and a processor operative for processing said radar return signals to provide signals representative of targets lying in an uneclipsed range nominally corresponding to the sums of (a) the sum of said first and second time durations and (b) the duration of said second pulse.

17. The system of claim 16, wherein said second time duration is less than said first time duration.

18. The system of claim 16, wherein the third time duration is equal to that of the first time duration.

19. The system of claim 16, wherein said third time duration follows said first and second time durations.

20. The system of claim 16, wherein said transmitter transmits additional pulses at additional frequencies, which additional frequencies are different from each other and from said first and second frequencies, said additional pulses being transmitted following said second pulse, and at least some of said additional pulses being transmitted later than the immediately preceding pulse by alternating ones of said first and second time durations; and wherein said receiver receives radar return signals at a frequency corresponding to one of said additional frequencies during a time interval which begins at a time following that pulse on which said one of said additional frequencies was transmitted by the sum of (a) one of said first and second time durations and (b) a pulse duration.

* * * * *